(12) United States Patent
Boschert et al.

(10) Patent No.: US 8,930,018 B2
(45) Date of Patent: Jan. 6, 2015

(54) METHOD FOR CONTROLLING MATERIAL FLOWS, E.G., IN THE FORM OF BULK MATERIAL AND THE LIKE AND CORRESPONDING DEVICE

(75) Inventors: Stefan Boschert, München (DE); Torsten Hellmuth, Erlangen (DE); Hermann Georg Mayer, Prien am Chiemsee (DE); Roland Rosen, Herrsching (DE); Martin Schneider, München (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 13/820,527

(22) PCT Filed: Aug. 12, 2011

(86) PCT No.: PCT/EP2011/063969
§ 371 (c)(1),
(2), (4) Date: Mar. 4, 2013

(87) PCT Pub. No.: WO2012/028442
PCT Pub. Date: Mar. 8, 2012

(65) Prior Publication Data
US 2013/0166065 A1 Jun. 27, 2013

(30) Foreign Application Priority Data

Sep. 2, 2010 (DE) .......................... 10 2010 036 173
Feb. 15, 2011 (DE) .......................... 10 2011 004 141

(51) Int. Cl.
*B65G 43/10* (2006.01)
*G05D 7/06* (2006.01)
*B65G 43/08* (2006.01)

(52) U.S. Cl.
CPC .............. *G05D 7/0605* (2013.01); *B65G 43/08* (2013.01)

USPC ................. 700/230; 700/226; 177/1; 177/16; 235/385; 414/339

(58) Field of Classification Search
USPC .......................................................... 700/230
See application file for complete search history.

(56) References Cited

U.S. PATENT DOCUMENTS 3,834,473 A * 9/1974 Girard et al. ....................... 177/1
5,048,719 A   9/1991 Empl et al. ...................... 221/119

(Continued)

FOREIGN PATENT DOCUMENTS

FR    2744707 A1   8/1997   ................ B60P 3/22
WO   2012/028442 A2   3/2012   ............ G05D 7/0605

OTHER PUBLICATIONS

Lampen, M.H., "Material Tracking System for Bulk Material Handling," 6th International Symposium on Mine Mechanization and Automation, South African Institute of Mining and Metallurgy, Book Abstract, 1 page, Sep. 1, 2001.

(Continued)

*Primary Examiner* — Gene Crawford
*Assistant Examiner* — Kyle Logan
(74) *Attorney, Agent, or Firm* — King & Spalding L.L.P.

(57) ABSTRACT

A device for controlling material flows may include at least one feeding device for feeding material of at least one type of material, at least one output device for outputting material of at least one type of material, a transport device for transporting the material, at least one sensor for determining at least one state-dependent parameter of the device, and a control device for controlling the devices, the control device being designed to process event-based signals, e.g., signals from the at least one sensor.

9 Claims, 4 Drawing Sheets

(56) References Cited

U.S. PATENT DOCUMENTS

| | | | | |
|---|---|---|---|---|
| 5,273,225 A | | 12/1993 | Backhaus | 242/474.1 |
| 5,293,308 A | | 3/1994 | Boys et al. | 363/37 |
| 6,151,535 A | * | 11/2000 | Ehlers | 700/226 |
| 2002/0185316 A1 | * | 12/2002 | Carlson | 177/16 |
| 2007/0297883 A1 | * | 12/2007 | Ash | 414/339 |
| 2009/0266891 A1 | * | 10/2009 | Santucci et al. | 235/385 |

OTHER PUBLICATIONS

International Search Report and Written Opinion, Application No. PCT/EP2011/063969, 20 pages, Mar. 1, 2013.

\* cited by examiner

FIG 3

METHOD FOR CONTROLLING MATERIAL FLOWS, E.G., IN THE FORM OF BULK MATERIAL AND THE LIKE AND CORRESPONDING DEVICE

CROSS-REFERENCE TO RELATED APPLICATIONS

This application is a U.S. National Stage Application of International Application No. PCT/EP2011/063969 filed Aug. 12, 2011, which designates the United States of America, and claims priority to DE Patent Application No. 10 2010 036 173.9 filed Sep. 2, 2010 and DE Patent Application No. 10 2011 004 141.9 filed Feb. 15, 2011. The contents of which are hereby incorporated by reference in their entirety.

TECHNICAL FIELD

The disclosure relates to a device for controlling material flows, e.g., in the form of bulk material and the like, a corresponding device as well as corresponding applications. Although applicable to any given devices for control of material flows, the present disclosure and its underlying background are explained in respect of methods and devices for control of transport flows of bulk material.

BACKGROUND

Methods or devices for controlling material flows are used for example in the area of transport of pulverized or bulk-type materials, e.g. in the field of mining for transport of ores and the like. A device for controlling material flows has become known from U.S. Pat. No. 3,834,473. In this case a specific amount of material fed in is output again for further processing in timed doses.

A usual device for controlling material flows can in such cases have a closable silo which contains the material to be transported. The silo in such cases is filled for example by means of an excavator which has extracted iron ore. The silo is closed off in the lower area. A transport belt is disposed at the lower end of the silo for example so that, when the silo is opened, the iron ore can fall down accordingly onto the transport belt. The transport belt transports the iron ore to a predetermined location and it is output there to a further processing device, for example in the form of a rail car loading device, with which the iron ore is to be loaded into corresponding cars for further transport.

A control device is usually provided for control of the transport from the silo to the railway loading device, which continuously monitors the state of the device on the basis of one or more sensors. For this purpose the current measured values of the sensors are interrogated at regular intervals. This requires a high computing outlay and in addition a high energy outlay.

SUMMARY

One embodiment provides a device for controlling material flows, e.g., in the form of bulk material and the like, comprising at least one feeder device for feeding material of at least one material type, at least one output device for outputting material of at least one material type, a transport device for transporting the material, at least one sensor for determining at least one state-dependent parameter of the device, and a control device for controlling the devices, with the control device being designed to process event-based signals, e.g., signals of the at least one sensor.

In a further embodiment, the device comprises two sensors, wherein at least one sensor is disposed on the feeder device. In a further embodiment, the at least one sensor on the feeder device is embodied to measure a material flow.

In a further embodiment, the control device has a calculation device which is embodied to calculate a future state of the device.

In a further embodiment, the control device has a memory device, which is embodied for storing at least one list, wherein the list is an event-based list and comprises at least the entries feed time, output time and quantity of material as well as at least the two entries feed and output of the material.

In a further embodiment, the device comprises a plurality of feeder devices an/or output devices.

In a further embodiment, the control device is embodied to control the velocity of the transport device, e.g., as a function of the calculated future state of the device.

Another embodiment provides a system for processing material flows, comprising a device as disclosed above, and a further processing device, wherein the further processing device has a sensor for detection of a state of the further processing device and wherein the control device is embodied for controlling the system.

Another embodiment provides a method for control of material flows, e.g., suitable for execution with a device as disclosed above and/or suitable for execution with a system as disclosed above, and comprising the following steps: a) Feeding of material of at least one material type by means of a feeder device, b) Transport of the material by means of the transport device, c) Output of the material by means of an output device, wherein a first state is determined by means of the sensor for determining at least one state-dependent parameter of at least one device on occurrence of a predetermined event and a future state is calculated on the basis of the first state.

In a further embodiment, an event-based list is created, comprising at least the entries feed time, output time and quantity of the material as well as at least the two events feed and output of the material.

Another embodiment provides for the use of a device as disclosed above and/or of a system as disclosed above for control of material flows, e.g., bulk materials and/or pulverized material.

Another embodiment provides for the use of a device as disclosed above and/or of a system as disclosed above for transport of material flows, e.g., bulk materials and/or pulverized material.

BRIEF DESCRIPTION OF THE DRAWINGS

Exemplary embodiments will be explained in more detail below on the basis of the schematic drawings, wherein:

FIG. 2$a,b$ shows a flow diagram for a reversing belt for material transport in accordance with a second embodiment of the present disclosure; and FIG. 3$a,b$ shows a flow diagram for a belt for material transport with a number of outputs in accordance with a third embodiment of the present disclosure.

FIG. 4$a,b$ shows a basic diagram of a belt conveyor with control device in accordance with a fourth embodiment of the present disclosure.

DETAILED DESCRIPTION

Embodiment of the present disclosure provide methods and devices that may save energy and at the same time entail reduced computing effort. Some embodiments may provide a longer service life and extended maintenance intervals for the device. Some embodiments may also improve accuracy.

In some embodiments, if the control device is embodied for processing event-based signals, on occurrence of an event, for example the feeding of the material, the corresponding feed point is detected precisely, whereas in a regular timed interrogation, the time of the occurrence of the event cannot be delimited precisely but merely to an interval between two consecutive points in time. At the same time the computing outlay and the data rate to be transmitted is reduced by this since the sensor no longer has to be interrogated or monitored respectively at regular intervals but instead the sensor sends a signal when the event changes, for example if a silo for feeding material is briefly opened. At the same time the lifetime of the device is increased since at least the sensor concerned has to transfer fewer signals. In addition the maintenance intervals of the device are lengthened, which also saves money.

Thus, some embodiments provide an at least partly event-based detection of a state of the device and especially on the basis of the state to calculate a future state by means of state-dependent parameters and especially to control the device accordingly.

In some embodiments the arrangement contains two sensors, wherein at least one sensor is disposed on the feeder device. An advantage in this case is that at least a changing state of the feeder device can be detected and via the second sensor a further state parameter of the device can be determined, so that then the future state of the output device and/or of the transport device can be determined in a simple and reliable manner.

Expediently at least one sensor is embodied on the feeder device for measuring a material flow. In this way it is possible to determine a material flow from the feeder device onto the transport device, by the flow (volume/time) of the material being determined by the sensor. If at the same time the corresponding time is determined during which the material flow is fed onto the transport device, a simple and reliable determination of the material volume in the transport device is possible. This enables the situation to be prevented in which there is too much material in the transport device and said device thus becomes blocked or overloading occurs with a corresponding mass of the material.

Expediently the control device comprises a computing device which is embodied to calculate a future state of the device. A possible advantage achieved in this case is that the time of output of the material to be transported can be reliably determined in this way. Additional and thus more expensive sensors which identify the output and/or the type of material during output can thus be dispensed with.

The control device may include a memory device which is embodied for storage of at least one list, wherein the list is an event-based list and comprises at least the entries feed time, output time and quantity of the material as well as at least the two events feeding and output of the material. It is possible in a simple manner by means of the memory device to store an event-based list and if necessary modify it if newly occurring events, for example a change in the transport velocity, require a change of an entry in the event-based list.

Some embodiments include an arrangement of a plurality of feeder devices and/or output devices. A possible advantage achieved in this case is that with this the number of different material flows from for example different reservoirs can be transported on a single transport device, e.g. sequentially one after the other to different outputs. Thus the flexibility of the device is significantly increased. If only a plurality of feeder devices with different feeds are arranged for the transport device, a number of materials can be provided at an output in a specific mixture ratio, in that these will be transported one after the other by means of the transport device in a suitable container. If the arrangement is one feeder device and a number of output devices material can be provided for example in a simple manner to different processing stations. A processing time for material can thus be significantly reduced.

Expediently the control device is embodied for regulating the velocity of the transport device, e.g., as a function of the calculated future state of the device. A possible advantage achieved by this is that it makes a flexible and simultaneously precise control of the material flow possible. If for example the velocity with which the material is transported changes, the transported material is output at a time different from that calculated at the time at which the material was fed into the transport device. Thus the material, if it is to be further processed after transport and output, for its further processing, for example depending on the precise composition of the material, can always be made available in a suitable quantity or quantity/time respectively.

An event-based list may be created comprising at least the entries feeding time, output time and quantity of the material as well is at least the two events feeding and output of the material. A possible advantage achieved in this case is that an optimum memory requirement for the event-based list and entries of the event-based list is made possible. Naturally it is possible to supplement the list by other entries, for example by the corresponding feeds and/or outputs if the arrangement includes a number of feeds and/or outputs.

Figure 1:
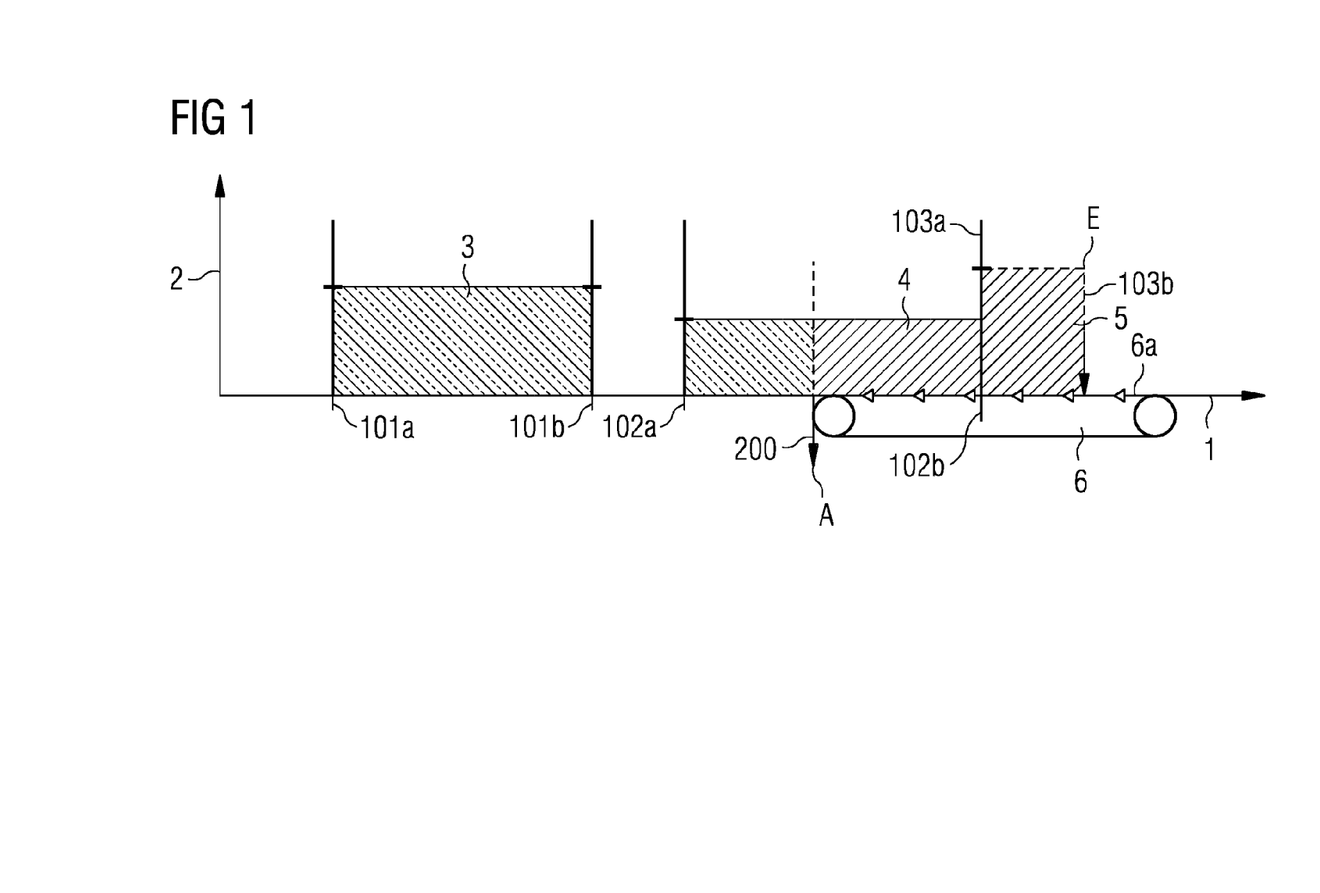
FIG. 1 shows a flow diagram for a belt conveyor in accordance with a first embodiment of the present disclosure.

FIG. 1 shows—as do FIGS. 2a, b and 3a, b—an xy-diagram, wherein the time is plotted on the x-axis 1 and the volume per unit of time is plotted on the y-axis 2. Also shown are three material packages 3, 4, 5, which are shown as rectangles in the xy-diagram. The length of the rectangle gives the time in which material was fed onto a belt conveyor 6. The height of the rectangle gives the rate with which volumes of the material are fed onto the belt conveyor 6. The area of the rectangle thus reflects the volume of the material overall.

The first second and third material package 3, 4, 5 are fed in consecutively. The first material package 3 has a first output time 101a and a first stop time 101b. The output time in this case is the time at which the material from the material package leaves the belt conveyor. The stop time is the time at which the material package has completely left the belt conveyor. In this case the belt 6a of the belt conveyor 6 can move at a first predetermined velocity. In FIG. 1 the belt is moving from right to left.

Between the stop time 101b of the first material package 3 and the output time 102a of the second material package 4 no new material has been loaded onto the belt conveyor 6; the material flow on the belt conveyor is thus 0 m$^3$/h. The first material package 3 is already complete, the second material package 4 in accordance with FIG. 1 has been partly output onto the belt conveyor 6 at a simulation time 200, and is partly still on the belt conveyor 6 (in FIG. 1 to the right of the simulation time 200). The simulation time 200 in FIG. 1 represents the time of the output the material, i.e. when the corresponding material has reached the end of the belt conveyor 6 and this leaves the belt conveyor 6 for further processing.

The second material package 4 has furthermore been loaded onto the belt conveyor 6 with a lower volume/time rate. The stop time 102b of the second package is in this case to the right of the simulation time 200 and the stop time 102b corresponds to the output time 103a of the third material package 6. The third material package 5 is loaded onto the belt conveyor 6 with a greater volume/time rate than the first and the second material package 3, 4, however the feeding of the third material package 6 is slower overall, i.e. the period of time between the third output time 103a and stop time 103b is smaller than that between first and second output time 102a and stop time 102b.

For each change of a state of the belt conveyor 6, i.e. on occurrence of a new event, for example a change in the belt velocity or feeding in or output of material packages etc., a corresponding event-based signal is transferred by means of the sensor to a control device. The control device then calculates the volume located on the belt conveyor 6 as well as the output time for the respective material package on the basis of the velocity of the belt of the belt conveyor, of the fed-in volume of material, for example on the basis of the opening time of a silo and the flow velocity of the material. Furthermore it is possible to calculate the loading of the belt conveyor, i.e. the weight of the material present on the belt conveyor 6.

If a new material package is loaded onto the belt conveyor 6, the output time at the output is calculated by the control device in each case. Furthermore it is possible, if part of the material package has already left the belt conveyor and part is still present on the belt 6a of the belt conveyor 6, to calculate the weight force of the part of the material package which is present on the belt at any desired time.

Thus if material packages 4, 5 are loaded onto the belt conveyor 6 at feed E, which is disposed for example above and in the area of the belt 6a, the output time will be determined as follows: The output time is calculated from the sum of simulation time 200 and the quotient of the amount of the difference in distance between feed E and output A and the belt velocity. The quantity of material of the respective material package 3, 4, 5 is then calculated by means of the product from the difference between output time and stop time and the material volume flow. The quantity of material discharged by the belt conveyor 6 is calculated by means of the integral of the material flow over the time difference between the simulation time and the first output time. The quantity of material still present on the belt of the belt conveyor 6 can be calculated by means of the integral of the material flow over the time difference between end time and simulation time. In this way it is possible at any given time to calculate the quantity of material present on the belt of the belt conveyor in each case and the quantity of material previously already output.

If the respective output time 101a, 102a, 103a is greater than the simulation time 200, the respective material package 3, 4, 5 has not yet reached the output A of the belt conveyor 6. If the output time 101a, 102a, 103a is less than the simulation time 200, this package has already reached the output A and has at least partly left the belt 6a of the belt conveyor 6.

Figure 2:
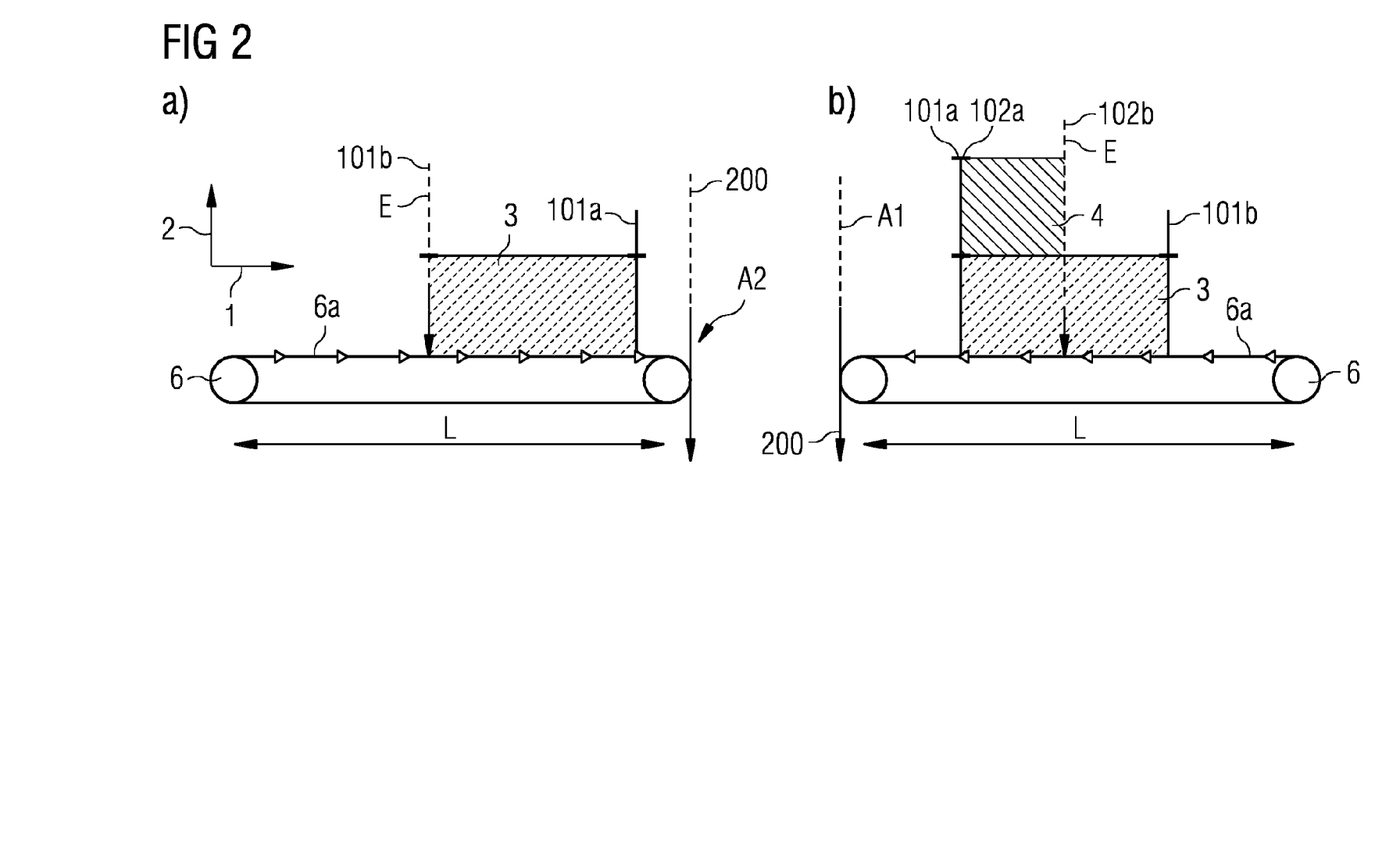
Figure 3:
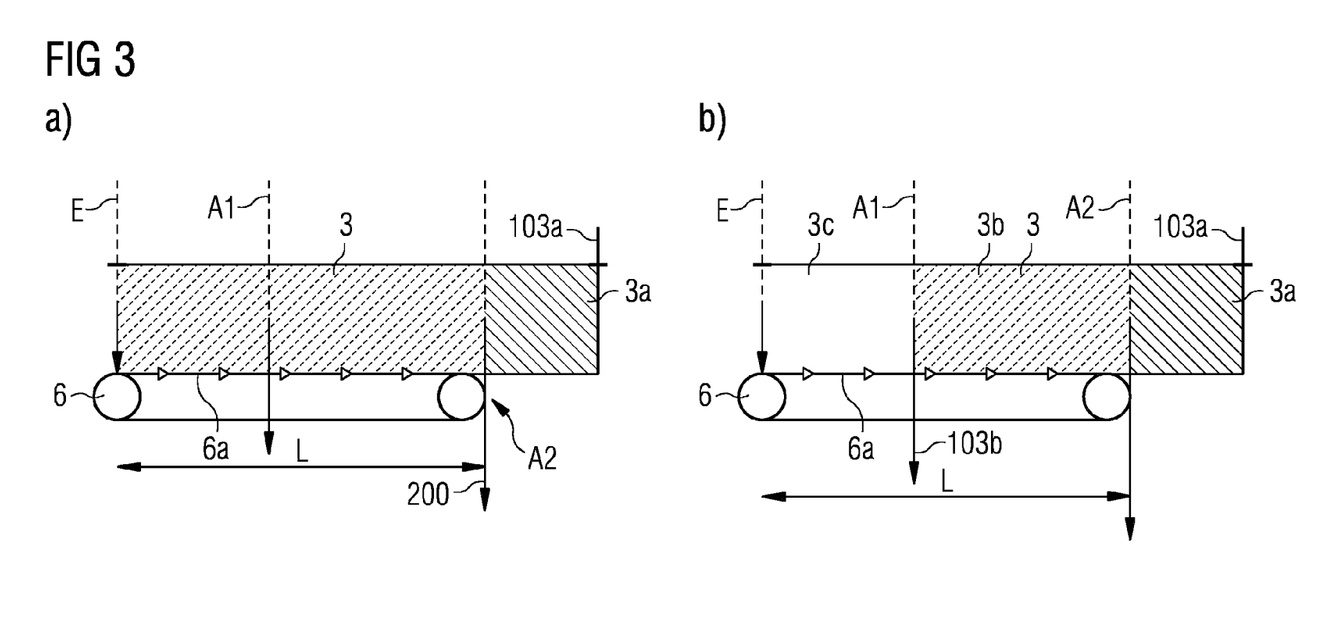

Overall FIG. 1 and also the other FIGS. 2 and 3 represent the material flows as step functions over time. Changes in the material flows are held together with the respective components, i.e. for example feed silo, belt conveyor etc. in a data structure. Also stored in this data structure is the output time, i.e. the time at which the material packages available from the output, the time at which the material package is no longer being output, i.e. the stop time, and the material flow (volume of material per unit of time). In addition the respective material type, for example iron ore etc. is stored. If the device also has a number of outputs and/or feeds for the respective material, the corresponding output and/or feed is also stored. Each output time and each stop time is linked to a corresponding event. Events in this case are for example: Change of the material flow at the output, stopping of the material output or activation of the output in order to output material. In addition each event can be assigned a specific identification number, known as the EventID. A correspondingly embodied control device can then use this list-type data structure centrally in the form of tuples for controlling a corresponding device. Such a data structure can be stored in a memory chip for example, to which the control device can have access or which for example is part of the control device. The control device can then make corresponding entries and/or changes if a new event occurs. Thus for example when a new material package is loaded onto the belt conveyor, a new entry or a new corresponding tuple respectively can be created in the data structure for the new material package.

FIG. 2 shows a flow diagram for a reversing belt for material transport in accordance with a second embodiment of the present disclosure.

FIG. 2 shows a reversing belt conveyor 6 with a belt 6a. Unlike the belt conveyor of FIG. 1, the belt 6a is reversible, i.e. able to be moved in two directions; the belt conveyor 6 has a predetermined length L. Disposed at the two ends of the belt conveyor are two outputs A1, A2, via which material can be output. The arrangement also includes a feed E which is used for feeding in material packages 3, 4, and which is essentially disposed in the middle of and above the belt conveyor 6.

In FIG. 2a the belt 6a moves from left to right in the direction of the second output A2. Material is now continuously loaded onto the belt 6a for a predetermined period of time. The material package 3 produced by this activity is thus located to the right of the feed E on the belt 6a of the belt conveyor 6 and has not yet reached the output A2. The direction of conveyance of the belt 6a is now reversed and the material package 3 now moves to the left on the belt 6a, as depicted in FIG. 2b. At the same time a second material package is loaded onto the belt conveyor 6 at feed E, such that the output time 101a of the first material package 3 and the output time 102a of the second material package coincide.

The difference between the two output and stop times 101a, 101b of the first material package 3 compared to the difference between the corresponding times 102a, 102b of the second material package 4 can in this case be greater in a special case. The output time of the two material packages 3, 4 can be calculated as a quotient from the difference of the distance between feed E and first output A1 and the corresponding belt velocity. In order to calculate the time of the end of the output of the respective material packet 3, 4, i.e. the stop time 101b, 102b, the difference between the quotient from belt length L and belt velocity and the difference between output time 101a, 102a and simulation time 200 is formed. This corresponds to the difference in time until the respective material package 3, 4 is transported from output A2 to output A1 and the time at which the material package 3,4 would have reached the output A2.

In this way belt conveyors 6 in which the direction of conveyance changes can also be used. In the data structure which—as already shown above—contains corresponding entries for the events, material packages, etc., the respective events are then modified for the respective material packages on the belt and corresponding entries are made in the data structure for new material packages. The material flow at the output A1 of the belt conveyor 6 is then produced as the sum of the material flows of the material packages 3, 4 as soon as the material packages have arrived at output A1: The time of the output is thus available or is equal to the simulation time 200.

FIG. 3 shows a flowchart for a belt for material transport with several outputs in accordance with a third embodiment of the present disclosure.

FIG. 3a shows a belt conveyor 6 essentially as is shown in FIG. 1. Unlike in FIG. 1 the belt conveyor is provided with tripper cars and the arrangement has several outputs. In FIG. 3a,b the arrangement has one feed E und two outputs A1 and A2, wherein the feed E is disposed at the start of the belt (in FIG. 3a in the left-hand area of the belt conveyor) and the output A2 is disposed at the end of the belt. The first output A1 is located between the feed E and the output A2.

In FIG. 3a a material package 3, which has been loaded via the feed E onto the belt conveyor 6, is to be transported to output A2. The output time 103a of the material package 3 is calculated by the amount of the difference of the distance between output A2 and feed E divided by the velocity of the belt of the belt conveyor. Subsequently the output is now switched over, i.e. output A1 is now to output material instead of output A2. This type of switchover of the output can be caused by an external event, for example congestion in the further processing of the material, which is correspondingly output via the second output A2.

If output A1 is now active, i.e. the material package 3 is to be output via the output A1, the material package 3 will essentially be divided into two material packages 3b, 3c in the area of the first output A1: the material package 3b is located in this case between output A1 and output A2 on the belt conveyor 6 and is transported on to output A2 and completely output there, i.e. until the stop time 103b of the material package 3b is greater than the simulation time 200. The stop time 103b of the material package 3b is calculated from the sum of simulation time and the amount of difference in distance between output A2 and output A1 divided by the velocity of the belt of the belt conveyor 6. At simulation time 200 material is already being output at output A2 in accordance with FIGS. 3a, 3b, i.e. the output time 103a of the material package 3 is smaller, i.e. lies in the past relative to the simulation time. The second material package 3c is output via the output A1.

In FIGS. 3a, 3b the situation is thus presented in which a switch is made from an output A2 back to an output A1. The switching back means here that the output A1 lies in the direction of conveyance upstream of the output A2. No new material package is formed for a switch from output A1 to output A2. Such a material package would simply be transported on to output A2 and the output via output A1 would be stopped when the switch was made. In the data structure already mentioned above the output for the material package would then merely have to be updated and a new output time and a new stop time calculated for the corresponding material package.

Naturally it is possible to provide any given number of feeds and/or outputs. With several feeds a corresponding data structure can be provided for each feed; at the outputs via which the material is output, the respective material flows can then be summed into an overall material flow. If for example the velocity of the belt is then changed, only the output and stop times as well as the events associated with the said times have to be updated.

Figure 4:
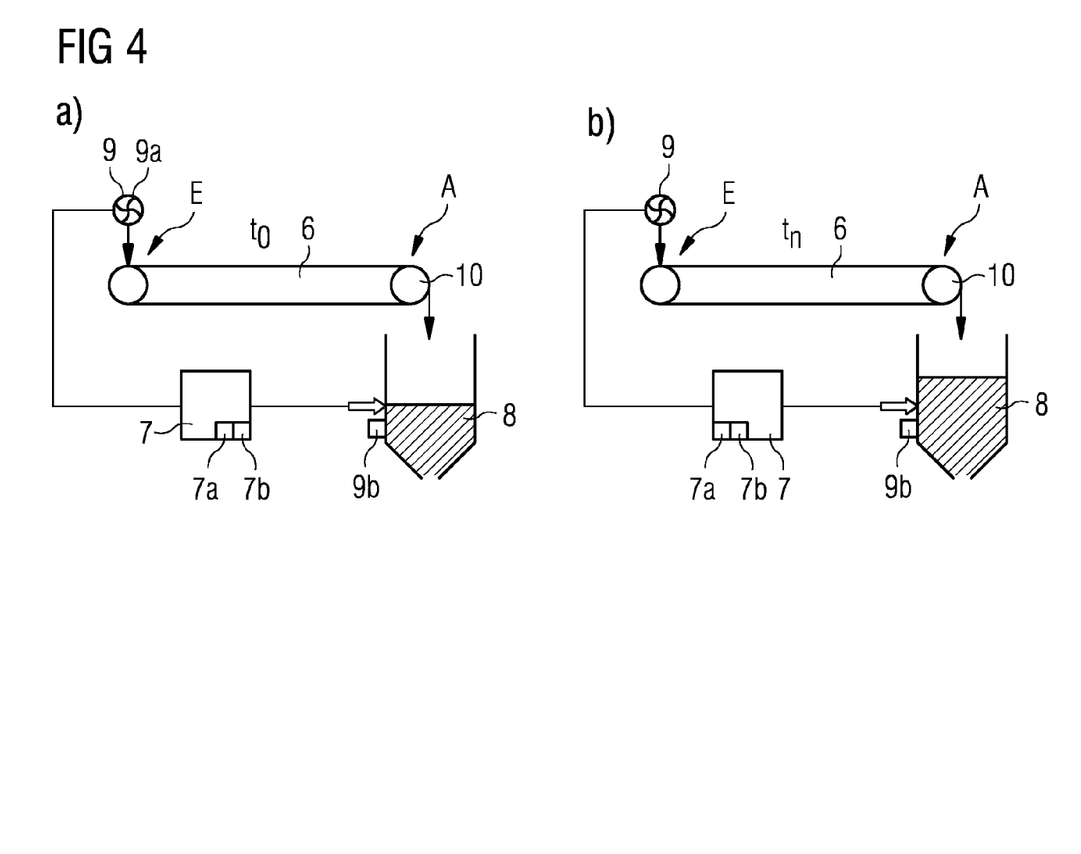

FIG. 4 shows a basic diagram of a belt conveyor with control device in accordance with a fourth embodiment of the present disclosure.

FIG. 4 shows a belt conveyor 6 having a feed E on its left-hand side and an output A on its right-hand side. In this case the belt conveyor 6 has a circulating belt which transports material from the area of the feed E to the output A for output of the material. In the area of the feed E material is loaded by means of a conveyor device 9 from a silo (not shown) which contains material to be transported, onto the belt conveyor 6. The material is then transported to output A, loaded there by means of an output device 10 into a silo 8. At a time $t_0$ a control device 7 detects the fill level of the silo 8 by means of a second sensor 9b on the basis of a predetermined threshold value. Furthermore a first sensor 9a measures the material flow which is being loaded by means of the conveyor device 9 onto the belt conveyor. If the said threshold value is exceeded for the silo, the state of the overall system, comprising silo 8, belt conveyor 6 with a predetermined length and its predetermined belt velocity, and material flow through the conveyor device 9 is known. On the basis of the established state at time to, the control device 7, comprising a processing device 7a and a memory device 7b, can now calculate the state of the device and of the system, comprising the device with feed, output and transport device 6, 9, 10 as well as control device 7 and the silo 8 at any given future point in time $t_n$. A continuous measurement of the fill level of the silo, for example to avoid overfilling, can thus be dispensed with.

Some embodiments may be used on the one hand to reduce computing effort and memory requirement, on the other hand energy consumption also falls. In addition the accuracy may be increased since no discretization errors occur, which increases the efficiency of the material transport overall since for example material losses as a result of imprecision in transport resulting from discretization errors may be avoided.

What is claimed is:

1. A device for controlling material flows, comprising:
    at least one feeder device for feeding material of at least one material type,
    at least one output device for outputting material of at least one material type,
    a transport device for transporting the material,
    at least one sensor for determining at least one state-dependent parameter of the device, and
    a control device configured to:
        generate an event-based list that comprises at least the following types of entries: a feed time at which the material is initially fed to the transport device, an output time at which the material is initially output from the transport device, a feed-in volume of the material fed to the transport device, and changes in a velocity of the transport device,
        calculate a quantity of material present in or on the transport device by:
            determining a present material flow currently in or on the transport device based on the event-based list, and
            integrating the present material flow over time,
        calculate a quantity of material already output from the transport device by:
            determining an output material flow already output from the transport device based on the event-based list, and
            integrating the output material flow over time,
        control at least one of the transport device, the at least one feeder device, and the at least one output device based on at least one of (a) the calculated quantity of material present in or on the transport device and (b) the quantity of material already output from the transport device.

2. The device of claim 1, wherein the control device comprises a calculation device configured to calculate a future state of the device.

3. The device of claim 1, wherein the control device comprises a memory device configured for storing the event-based list.

4. The device of claim 1, comprising at least one of a plurality of feeder devices and a plurality of output devices.

5. The device as claimed of claim 1, wherein the control device is configured to control a velocity of the transport device as a function of at least one of (a) the calculated quantity of material present in or on the transport device and (b) the quantity of material already output from the transport device.

6. The device of claim 1, comprising two sensors, wherein at least one sensor is disposed on the feeder device.

7. The device of claim 6, wherein the at least one sensor on the feeder device is configured to measure a material flow.

8. A system for processing material flows, comprising:
a device for controlling material flows, comprising:
at least one feeder device for feeding material of at least one material type,
at least one output device for outputting material of at least one material type,
a transport device for transporting the material,
at least one sensor for determining at least one state-dependent parameter of the device, and
a control device configured to:
generate an event-based list that comprises at least the following types of entries: a feed time at which the material is initially fed to the transport device, an output time at which the material is initially output from the transport device, a feed-in volume of the material fed to the transport device, and changes in a velocity of the transport device,
calculate a quantity of material present in or on the transport device by:
determining a present material flow currently in or on the transport device based on the event-based list, and
integrating the present material flow over time,
control at least one of the transport device, the at least one feeder device, and the at least one output device based at least one on the calculated quantity of material present in or on the transport device, and a further processing device comprising a sensor configured to detect a state of the further processing device,
wherein the control device is configured to control the further processing device based at least on the calculated quantity of material present in or on the trans ort device.

9. A method for control of material flows using a device for controlling material flows and comprising at least one feeder device for feeding material of at least one material type, at least one output device for outputting material of at least one material type, a transport device for transporting the material, at least one sensor for determining at least one state-dependent parameter of the device, and a control device for controlling the transport device, the at least one feeder device, and the at least one output device, the method comprising:
feeding material of at least one material type by means of a feeder device,
transporting the material using the transport device,
outputting the material using an output device,
the control device generating an event-based list that comprises at least the following type of entries: a feed time at which the material is initially fed to the transport device, an output time at which the material is initially output from the transport device, a feed-in volume of the material fed to the transport device, and changes in a velocity of the transport device,
the control device calculating a quantity of material present in or on the transport device by:
determining a present material flow currently in or on the transport device based on the event-based list, and
integrating the present material flow over time,
the control device controlling at least one of the transport device, the at least one feeder device, and the at least one output device based at least on the calculated quantity of material present in or on the transport device.

* * * * *